XR RE 28,973

United States Patent [19]

Welstead, Jr.

[11] E Re. 28,973

[45] Reissued Sept. 21, 1976

[54] 3-(OMEGA-SUBSTITUTED ALKYL)-INDOLES

[75] Inventor: William J. Welstead, Jr., Richmond, Va.

[73] Assignee: A. H. Robins Company, Incorporated, Richmond, Va.

[22] Filed: June 13, 1975

[21] Appl. No.: 586,699

Related U.S. Patent Documents

Reissue of:

[64] Patent No.: 3,642,803
Issued: Feb. 15, 1972
Appl. No.: 556,879
Filed: June 13, 1966

U.S. Applications:

[63] Continuation-in-part of Ser. No. 504,087, Oct. 23, 1965.

[52] U.S. Cl. ..... 260/293.61; 260/295 B; 260/296 B; 260/326.14 R; 260/326.15; 424/263; 424/267; 424/274

[51] Int. Cl.[2] ..... C07D 401/06; C07D 403/06

[58] Field of Search ..... 260/293.61, 295 B, 296 B, 260/326.14 R, 326.15

[56] References Cited

UNITED STATES PATENTS

| | | | |
|---|---|---|---|
| 3,183,235 | 5/1965 | Fenitz | 260/294 |
| 3,294,805 | 12/1966 | Sallay et al. | 260/294.3 |

OTHER PUBLICATIONS

Janssen et al., J. Med. Chem. 2(1), 31–45 (1960).

*Primary Examiner*—Norma S. Milestone

[57] ABSTRACT

3-(omega-substituted alkyl)-indoles are disclosed which are useful in ameliorating the tremors of Parkinsonism. The compounds are prepared by metal hydride reduction of the precursor indole glyoxyloyl compounds.

24 Claims, No Drawings

3-(OMEGA-SUBSTITUTED ALKYL)-INDOLES

Matter enclosed in heavy brackets [ ] appears in the original patent but forms no part of this reissue specification; matter printed in italics indicates the additions made by reissue.

This application is a continuation-in-part of my copending application Ser. No. 504,087 filed Oct. 23, 1965.

The present invention relates to certain heterocyclic organic compounds which may be referred to as 3-(omega-substituted alkyl)indoles, acid addition and quaternary ammonium salts thereof, therapeutic compositions containing the same as active ingredients, and methods of making and administering them.

The novel compounds of the present invention have utility as physiologically active agents and are particularly effective in diminishing the tremors and muscular rigidity of Parkinsonism. The compounds are also useful as tranquilizers.

Prior art literature contains examples of 3-(omega-substituted alkyl)indoles. Those which have been examined in animal bodies have shown limited therapeutic value and are not disclosed to have anti-Parkinson activity. More recently a series of 1-, 2-, and 3-[2-(4-substituted piperazinyl)ethyl]indoles has been the subject of U.S. Pat. 3,188,313 with the disclosure of their therapeutic application as CNS depressants. However, these are likewise not disclosed to have anti-Parkinsonism activity.

Medicaments that have been used to ameliorate the symptoms of Parkinsonism have been derived from the belladonna group of alkaloids, particularly atropine and scopolamine; in addition synthetic medicinals such as Parsidol (TM), Artane (TM), Kemadrin (TM) and Disipal (TM) among others and certain antihistamine compounds have been used with varying degrees of success. Although all of the aforementioned drugs have been of therapeutic value in treating the tremors and muscular rigidity of Parkinsonism, they have not been universally tolerated and the dosages have had to be adjusted to the particular individual, and, moreover, these known drugs have produced various undesirable side effects. Examples of such side effects are dryness of mouth, nausea, giddiness, blurred vision, nervousness, tinnitus, sore mouth, mental confusion, marked agitation, epigastric burning, heavy feeling in the limbs or sensations of tingling in them, disorientation, anorexia and transient psychotic episodes. Anti-Parkinsonism agents eliminating or reducing the degree of any of the foregoing side effects are, therefore, highly desirable.

It is accordingly the primary object of the present invention to provide novel compounds that are useful in the palliative treatment of Parkinsonism, and particularly to provide compounds useful as anti-Parkinsonism agents and which produce minimal side effects. Further objects are to provide a method of using said drugs in the treatment of living animal and especially mammalian bodies, to provide pharmaceutical compositions which embody the said agents, and to provide a method for preparing said novel 3-(omega-substituted alkyl)indoles. Additional objects will be apparent to one skilled in the art and still further objects will become apparent hereinafter.

The novel compounds of the present invention can be represented by the following formula:

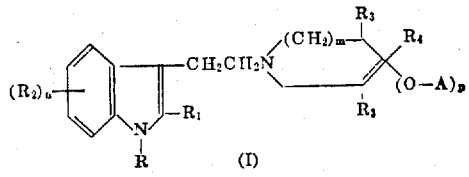

(I)

wherein:

R is selected from the group consisting of hydrogen, lower-alkyl, lower-alkanoyl, aroyl, monocarbocyclic aryl, phenyl-lower-alkyl and cycloalkyl; $R_1$ is selected from the group consisting of hydrogen, lower-alkyl and monocarbocyclic aryl; $R_2$ is selected from the group consisting of hydrogen, halogen having an atomic weight less than 80, trifluoromethyl, hydroxyl, lower-alkoxy and aralkoxy; $R_3$ is selected from the group consisting of hydrogen and methyl, no more than one methyl being present at one time; $R_4$ is selected from the group consisting of hydrogen, lower-alkyl, phenyl-lower-alkyl and monocarbocyclic aryl; A is selected from the group consisting of hydrogen, lower-alkanoyl, monocarbocyclic aryl, monocarbocyclic aroyl and monocarbocyclic aryl carbamoyl; n is an integer from 0–4 inclusive; m is either zero or one; p is either zero or one, and when p is zero the dotted line represents a double bond.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, n-propyl, isopropyl, n-butyl, sec-butyl, amyl, isoamyl, hexyl, heptyl, octyl, and the like. "Lower-alkoxy" has the formula—O—lower-alkyl.

The term "cycloalkyl" as used herein includes primarily cyclic alkyl radicals containing three up to nine carbon atoms inclusive and encompasses such groups as cyclopropyl, cyclobutyl, cyclopentyl, methylcyclohexyl, ethylcyclopentyl, and propylcyclohexyl. Included in the term "phenyl lower alkyl" are groups such as benzyl, phenethyl, methylbenzyl, phenpropyl and the like. "Lower-alkanoyl" has the formula

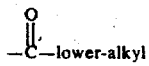

"Aroyl" has the formula

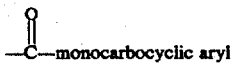

and "aralkoxy" has the formula: —O—lower-alkyl-monocarbocyclic aryl.

By monocarbocyclic aryl is meant a phenyl radical or a phenyl radical substituted by one or more substituents selected from the group consisting of halogen having an atomic weight less than 80, lower-alkyl, lower-alkoxy and trifluoromethyl. The lower-alkyl and lower-alkoxy radicals can contain up to three carbon atoms and each monocarbocyclic aryl radical, together with said substituents, can contain from six to nine carbon atoms. When the monocarbocyclic aryl radical is substituted by more than one of the above substituents, the substituent can be the same or different and can occupy any of the available positions on the phenyl ring. When the substituent is lower-alkyl, said constituent can be straight or branched and can contain from one to three carbon atoms. Thus when R represents a monocarbocyclic aryl radical it can represent an organic radical such as phenyl or a phenyl radical substituted by one or more substituents such as fluoro, chloro, bromo, methyl, isopropyl, methoxy, propoxy or trifluoromethyl. A total of nine carbon atoms in all ring substituents is the preferred maximum.

This invention also included acid addition salts of the above defined bases formed with nontoxic organic and inorganic acids. Such salts are easily prepared by methods known in the art. When the compounds are to be used as intermediates for preparing other compounds or for any other non-pharmaceutical use, the toxicity or nontoxicity of the salt is immaterial; when the compounds are to be used as pharmaceuticals, they are most conveniently used in the form of nontoxic acid-addition or quaternary ammonium salts. Both toxic and nontoxic salts are therefore within the purview of the invention. The acids which can be used to prepare the preferred nontoxic acid-addition salts are those which produce, when combined with the free bases, salts whose anions are relatively innocuous to the animal organism in therapeutic doses of the salts, so that beneficial physiological properties inherent in the free bases are not vitiated by side-effects ascribable to the anions.

The base is reacted with the calculated amount of organic or inorganic acid in aqueous miscible solvent, such as ethanol or ispropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric, and nitric acids.

In addition, this invention includes pharmaceutically acceptable, nontoxic quaternary ammonium salts of the above defined bases. The quaternary ammonium salts are readily formed by treatment of the corresponding free base with the appropriate salt-forming substance, including, for example, methyl chloride, methyl bromide, methyl iodide, methyl sulfate, ethyl chloride, ethyl bromide, ethyl iodide, n-propyl chloride, n-propyl bromide, n-propyl iodide, isobutyl iodide, sec-butyl bromide, n-amyl chloride, n-amyl bromide, n-amyl iodide, isoamyl chloride, n-hexyl chloride, n-hexyl bromide, n-hexyl iodide or similar quaternary salt-forming substances, according to general procedures which are well known in the art.

It will be readily apparent to one skilled in the art that certain compounds of this invention may be present as optical isomers. The connotation of the general formulas presented herein is to include all isomers, the separated d or l isomers as well as the dl mixtures of these isomers.

In general, the novel compounds of this invention are prepared starting from readily available selected indoles or from indoles prepared by the Fischer indole synthesis. The indoles are reacted with oxalyl chloride at 0°–25° C. according to the procedure of Speeter and Anthony, J. Am. Chem. Soc. 76, 6208–10 (1954) in an organic solvent inert under the conditions of the reaction, such as ether, dioxane, and the like to give indole-3-glyoxyoyl chloride. The preferred solvent is ether.

Preparation of the novel compounds of the invention which contain a 4-substituted piperidine or a 3-substituted pyrrolidine moiety is effected by reacting the appropriate piperidine and pyrrolidine compounds with an appropriately substituted indole-3-glyoxyloyl chloride in a suitable solvent such as benzene, chloroform, dioxane, toluene, acetonitrile and the like, which will not enter into the reaction but which will provide a reaction medium. An acid acceptor which may be an excess amount of the reacting heterocyclic compound, a tertiary amine or an alkali metal salt of a weak acid may be used, the alkali metal salt of a weak acid, e.g., sodium carbonate, sodium bicarbonate, potassium carbonate, and the like being the preferred acid acceptors. It was observed that indole-3-glyoxyloyl chloride is not readily hydrolyzed by water at or about room temperature and in an alternative procedure the reaction between an indole-3-glyoxyloyl chloride and the selected substituted piperidine or pyrrolidine can be conveniently carried out in a chloroform-water mixture. The alternate method is particularly convenient when the acid acceptor employed is an alkali metal salt of a weak acid. The purpose of the acid acceptor is to take up the hydrogen halide which is split out during the course of the reaction. The reaction is conveniently carried out at or about room temperature for a period of about 3 to 5 hours. Isolation of the product, a 1-(indole)-3-ylglyoxyl)-3-substituted pyrrolidine or 4-substituted piperidine, is achieved by dilution of the reaction mixture with water, separation of the organic and aqueous layers, and drying and concentration of the organic layer. The crude products are best purified by crystallization from a suitable solvent, chromatography or formation of a readily crystallizable organic or inorganic salt.

Reduction of the 1-(indol-3-ylglyoxyloyl)-3-substituted pyrrolidines and 4-substituted piperidines to the novel 3-[2-(3-substituted pyrrolidinyl)ethyl]indoles and 3-[2-(4-substituted piperidinyl)ethyl]indoles of the present invention is achieved by metal hydride reduction in an anhydrous organic solvent including, for example, ether, tetrahydrofuran, benzene, toluene, ethylene glycol, dimethyl ether, and the like. Metal hydrides generally used for reduction of carbonyl groups include lithium aluminum hydride, sodium borohydride, potassium borohydride, sodium borohydride-aluminum chloride, diisobutylaluminum hydride and the like. Lithium aluminum hydride is the preferred metal hydride. The compound to be reduced is dissolved or suspended in an anhydrous solvent and added dropwise, under nitrogen, to a stirred suspension of a metal hydride in an organic solvent. After refluxing the stirred reaction mixture for about 2 to 5 hours, the reaction mixture is worked up and the product separated by procedures well known in the art.

Preparation of the novel compounds of the invention which contain 4-substituted-3,4-dehydropiperidine and 3-substituted-3,4-pyrroline moieties can be carried out by alternate procedures. As one preparative method a 4-substituted-4-piperidinol is reacted with an indole-3-glyoxyloyl chloride and the resulting compound reduced by metal hydride combination to furnish the reduced compound as in the preparation of 3-[2-(4-hydroxy-4-phenylpiperidinyl)ethyl]indole. Dehydration of the latter compound under mildly acidic conditions furnishes 3-[2-(4-phenyl-3,4-dehydropiperidinyl-)ethyl]indole. In a second, preferred preparative method, a 4-substituted-4-piperidinol is dehydrated under mildly acidic conditions to a 4-substituted-3,4-dehydropiperidine which is reacted with an indole-3-glyoxyloyl chloride and the resulting 1-(indol-3-ylglyoxyloyl)-4-substituted-3,4-dehydropiperidine reduced by metal hydride combination to a 3-[2-(4-substituted-3,4-dehydropiperidinyl)ethyl]indole.

Dilute hydrochloric acid is generally used as a dehydrating agent. Other acids can be used equally well and are within the purview of this invention including, for example, hydrochloric acid-acetic acid, phosphoric acid, concentrated and dilute sulfuric acid, benzenesulfonic acid and p-toluenesulfonic acid.

The novel indole compounds may be purified by vacuum distillation or by crystallization of their well-defined organic or inorganic salts.

Preparation of the novel compounds of the present invention is not restricted to the preceding described methods but can also be prepared by alternative procedures. In one alternative method appropriately substituted indole-3-acetic acids are prepared from appropriately substituted hydrazones by the Fischer indole synthesis. The substituted indole-3-acetic acids are esterified by conventional esterification procedures and the esters reduced by metal hydrides to the corresponding substituted 3-(2-hydroxyethyl)indoles. Reaction of the latter with a thionyl halide furnishes a substituted 3-(2-haloethyl)indole, the gaseous by-products sulfur dioxide and hydrogen halide being removed from the reaction system by application of a slight vacuum or by sweeping the by-product gases out of the reaction system by the use of an inert gas, as, for example, nitrogen. The substituted 3-(2-hydroxyethyl)indoles can also be converted to their arylsulfonate esters by reaction with benzenesulfonyl chloride or p-toluenesulfonyl chloride in an inert organic solvent as, for example, benzene. By treating the resulting substituted 3-(2-hydroxyethyl)indoles or the arylsulfonate esters of the substituted 3(2-hydroxyethyl)-indoles with a 3-substituted pyrrolidine, a 4-substituted piperidene, a 3-substituted-3,4-pyrroline or a 4-substituted-3,4-dehydropiperidine in the presence of a suitable acid acceptor which may be a molar excess of the organic base, a tertiary amine or an alkali metal salt of a weak acid, the desired 3-[2-(3-substituted pyrrolidinyl)ethyl]indoles, 3-[2-(4-substituted piperidinyl)ethyl]indoles, 3[2-(3-substituted-3,4-pyrroline)ethyl]indoles and 3-[2-(4-substituted-3,4-dehydropiperidinyl)ethyl]indoles are obtained.

PREPARATION OF INTERMEDIATES

Preparation 1

1-inol-3-ylglyoxylolyl)-3-(o-methoxyphenoxy)-pyrrolidine.—To a stirred mixture of 11.5 g. (0.06 mole) of 3-(o-methoxyphenoxy)-pyrrolidine and 10 g. of sodium carbonate in 100 ml. of chloroform and 35 ml. of water was added slowly over a ten minute period 11.5 g. (0.056 mole) of indole-3-glyoxyloyl chloride. After stirring one hour 25 ml. of water was added and stirring continued an additional two hours. The organic layer was separated and washed successively with water, 3 N hydrochloric acid, water and 3 N sodium hydroxide. The chloroform solution was dried over magnesium sulfate and concentrated leaving a viscous oil which solidified on standing. The solid was suspended in hot benzene and treated with absolute ethanol until solution of the solid occurred. After concentrating the solution to two-thirds of the original volume, isooctane was added to the hot solution. After cooling 17.0 g. (83%) of product separated, M.P. 173°–176° C. Recrystallization from the same solvent system raised the melting point to 175–177° C.

Analysis.—Calculated for $C_{21}H_{20}N_2O_4$ (percent): C, 69.21; H, 5.53; N, 7.69. Found (percent): C, 69.55; H, 5.57; N, 7.99.

Preparation 2

1-[(2-methylindol-3-yl)glyoxyloyl]-3-hydroxypyrrolidine.—3-pyrrolidinol (12.5 g; 0.144 mole) was added dropwise over a 30 minute period to a vigorously stirred mixture of 32 g. (0.144 mole) of 2-methylindole-3-glyoxyloyl chloride, 40 g. of sodium carbonate and 400 ml. of dry benzene. After stirring 24 hours at room temperature, 200 ml. of water was added, the original solid suspension changing to a red gum. After standing several days in benzene the red gum solidified to a red solid melting at 180°–190° C. The melting point could not be improved but thin layer chromatography indicated the material to be quite pure. The yield was 25.0 g. (64%).

Preparation 3

1-[5,6-dimethoxyindol-3-yl)glyoxyloyl]-3-hydroxypyrrolidine.—(a) To a stirred mixture of 8.0 g. (0.03 mole) of 5,6-dimethoxyindole-3-glyoxyloyl chloride, 5 g. of sodium carbonate, 25 ml. of water and 75 ml. of chloroform was added 2.6 g. (0.03 mole) of 3-pyrrolidinol. After stirring one hour at room temperature the mixture was filtered and the cake washed with water and then chloroform. The dried product weighed 4.05 g. (42%) and melted at 224°–226° C. Recrystallization from methanol-water raised the melting point to 229°–231° C.

Analysis.—Calculated for $C_{16}H_{18}N_2O_5$ (percent): C, 60.37; H, 5.70; N, 8.80. Found (percent): C, 60.32; H, 5.76; N, 9.34.

(b) 3-pyrrolidinol (0.95 g.; 0.01 mole) was added to a stirred mixture of 2.9 g. (0.01 mole) of 5,6-dimethoxyindole-3-glyoxyloyl chloride, 4.0 g. of sodium carbonate and 100 ml. of benzene. After stirring overnight at room temperature, 50 ml. of water was added. The mixture was stirred 30 minutes, filtered and the cake washed with water and then with benzene. The dried material weighed 1.45 g. (45%) and melted at 222°–225° C.

Preparation 4

1-(indol-3-ylglyoxyloyl)-3-hydroxypyrrolidine.—A solution of 1.25 g. (0.014 mole) of 3-pyrrolidinol and 3.0 g. of sodium carbonate in 35 ml. of water was treated all at once with 3 g. (0.014 mole) of indole-3-glyoxyloyl chloride and the mixture stirred at room temperature for 24 hours. The product was isolated by filtration and recrystallized from absolute alcohol. The yield was 2.6 g. (70%) and the material melted at 216°–218° C.

Analysis.—Calculated for $C_{14}H_{14}N_2O_3$ (percent): C, 65.10; H, 5.46; N, 10.85. Found (percent): C, 65.19; H, 5.48; N, 10.97.

Preparation 5

1-[(2,5-dimethylindol-3-yl)glyoxyloyl]-4-phenyl-3,4-dehydropiperidine.—2.5 dimethylindole-3-glyoxyloyl chloride (9.5 g.; 0.0405 mole) was added, in portions, to a stirred mixture of 9.8 g. (0.05 mole) of 4-phenyl-3,4-dehydropiperidine hydrochloride, 25 g. of potassium carbonate, 150 ml. of chloroform and 100 ml. of water. After stirring 30 minutes the layers were separated, the aqueous layer extracted several times with chloroform, the combined chloroform solutions dried over magnesium sulfate and concentrated to an oil. Crystallizaton of the oil from ethanol-water gave 8.5 g. (59%) of product melting at 179°–182° C. An analytical sample recrystallized from the same solvent system melted at 182°–184° C.

Analysis.—Calculated for $C_{23}H_{21}N_2O_2$ (percent): C, 77.29; H, 5.92; N, 7.84. Found (percent): C, 76.94; H, 6.32; N, 7.81.

Preparation 6

1-(indol-3-ylglyoxyloyl)-4-phenyl-3,4-dehydropiperidine.—To a vigorously stirred mixture of 82.0 g. (0.42 mole) of 4-phenyl-3,4-dehydropiperidine hydrochloride, 87.5 g. of potassium carbonate, 350 ml. of chloroform and 350 ml. of water was added in portions 79 g. (0.381 mole) of indole-3-glyoxyloyl chloride. Chloroform (250 ml.) and 150 ml. of water was added during the addition to keep the reaction mixture fluid. After stirring 30 minutes the reaction mixture was filtered, the cake washed thoroughly with water and dried; the dried solid weighed 121 g. and melted at 192°–194° C. Recrystallization of the solid from acetonitrile gave 101.2 g. of material melting at 194°–196° C. Work-up of the filtrates gave additional material giving a total yield of 114.7 g. (90%).

Preparation 7

1-[(2-methylindol-3-yl)glyoxyloyl]-4-phenyl-3,4-dehydropiperidine.—Using the method of preparation 5, 18.7 g. (0.095 mole) of 4-phenyl-3,4-dehydropiperidine hydrochloride, 19.0 g. (0.086 mole) of 2-methylindole-3-glyoxyloyl chloride and 30 g. of potassium carbonate were mixed and reacted together in a chloroform-water medium to give 21.3 g. (72%) of 1-[(2-methylindol-3-yl)glyoxyloyl]-4-phenyl-3,4-dehydropiperidine melting at 165°–167° C.

Analysis.—Calculated for $C_{22}H_{20}N_2O_2$ (percent): C, 76.72; H, 5.85; N, 8.13. Found (percent): C, 76.75; H, 5.89; N, 8.14.

Preparation 8

1-[(5-chloroindol-3-yl)glyoxyloyl]-4-phenyl-3,4-dehydropiperidine.—Using the method of preparation 5, 13.0 g. (0.073 mole) of 4-phenyl-3,4-dehydropiperidine hydrochloride, 16.0 g. (0.066 mole) of 5-chloroindole-3-glyoxyloyl chloride and 18 g. (0.182 mole) of triethylamine were mixed and reacted together using chloroform as a solvent in a nitrogen atmosphere to give 11.6 g. (48.5%) of 1-[(5-chloroindol-3-yl)glyoxyloyl]-4-phenyl-3,4-dehydropiperidine melting at 200°–202° C. after crystallization from ethanol-water.

Analysis.—Calculated for $C_{21}H_{17}ClN_2O_2$ (percent): C, 69.13; H, 4.70; N, 7.68. Found (percent): C, 68.83; H, 4.57; N, 7.71.

Preparation 9

1-[(5-benzyloxyindol-3-yl)glyoxyloyl]-4-phenyl-4-piperindol.—Using the method of preparation 5, 21 g. (0.12 mole) of 4-phenyl-4-piperidinol, 36 g. (0.11 mole) of 5-benzyloxyindole-3-glyoxyloyl chloride and 17 g. (0.17 mole) of triethylamine were mixed and reacted together using chloroform as a solvent to give 33.5 g. (66%) of 1-[(5-benzyloxyindol-3-yl)glyoxyloyl]-4-phenyl-4-piperindol melting at 160°–163° C. (from ethanol-water). An analytical sample recrystallized from ethanol melted at 155°–157° C.

Analysis.—Calculated for $C_{28}H_{26}N_2O_2$ (percent): C, 73.99; H, 5.77; N, 6.16. Found (percent): C, 73.59, H, 5.74; N, 6.16.

Preparation 10

1-[(5,6-dimethoxyindol-3-yl)glyoxyloyl]-4-phenyl-3,4-dehydropiperidine.—Using the method of preparation 5, 6.65 g. (0.034 mole) of 4-phenyl-3,4-dehydropiperidine hydrochloride, 8.2 g. (0.0307 mole) of 5,6-dimethoxyindol-3-glyoxyloyl chloride and 15 g. of potassium carbonate were mixed and reacted together in a chloroform-water medium to give 7.9 g. (65%) of 1-[(5,6-dimethoxyindol-3-yl)glyoxyloyl]-4-phenyl-3,4-dehydropiperidine melting at 234°–237° C. An analytical sample crystallized from acetonitrile melted at 236°–239° C.

Analysis.—Calculated for $C_{23}H_{22}N_2O_4$ (percent): C, 70.75; H, 5.68; N, 7.18. Found (percent): C, 70.55; H, 5.85; N, 7.18.

Preparation 11

1-[(2-methyl-5,6-dimethoxyindol-3-yl)glyoxyloyl]-4-phenyl-3,4-dehydropiperidine.—Using the method of preparation 5, 12.4 g. (0.064 mole) of 4-phenyl-3,4-dehydropiperidine hydrochloride, 16.2 g. (0.055 mole) of 2-methyl-5,6-dimethoxyindol-3-glyoxyloyl chloride and 15.9 g. (0.159 mole) of triethylamine were mixed and reacted together using chloroform as a solvent in a nitrogen atmosphere. The isolated crude product was crystallized from benzene to give 18.1 g. of solid melting at 108°–111° C. A nuclear magnetic resonance spectrum indicated the solid to be a benzene solvate in a 1:1 ratio. An analytical sample recrystallized from benzene melted at 104°–106° C.

Preparation 12

1-[(1-methylindol-3-yl)glyoxyloyl]-4-phenyl-3,4-dehydropiperidine.—Twenty grams (0.061 mole) of 1-(indol-3-ylglyoxyloyl)-4-phenyl-3,4-dehydropiperidine was dissolved in 350 ml. of 2-butanone maintained just below the reflux temperature. While maintaining vigorous stirring, 25 g. of potassium hydroxide was added in one portion followed immediately by the dropwise addition of 19.8 g. (0.14 mole) of methyl iodide. Five minutes after the completion of the addition, the reaction mixture was filtered and the filtrate concentrated to an oil which solidified on standing. Recrystallization of the solid from ethyl acetate-isooctane gave 18.5 (92%) of product melting at 173°–176° C. An analytical sample recrystallized from acetone-water melted at 173°–175° C.

Analysis.—Calculated for $C_{22}H_{20}N_2O_2$ (percent): C, 76.72; H, 5.85; N, 8.13. Found (percent): C, 76.71; H, 5.80; N, 8.16.

Preparation 13

1-(indol-3-ylglyoxyloyl)-4-phenyl-4-piperindol.—A solution of 17.7 g. (0.01 mole) of 4-phenyl-4-piperidinol in 100 ml. of chloroform was added to a solution of 25 g. of potassium carbonate in 100 ml. of water. The resulting heterogeneous mixture was stirred vigorously while 20 g. of indole-3-glyoxyloyl chloride was added portionwise over several minutes. The mixture was stirred two hours and then the resulting precipitate was filtered off and washed with chloroform and water (34 g.). The product was dissolved in hot ethyl acetate, filtered, and treated with isooctane. After cooling, 18.6 g. (55%) of pure product was obtained which melted at 199°–201° C. Further recrystallization did not raise the melting point.

Analysis.—Calculated for $C_{21}H_{20}N_2O_3$ (percent): C, 72.39; H, 5.79; N, 8.04. Found (percent): C, 72.12; H, 5.97; N, 8.17.

Preparation 14

1-(indol-3-ylglyoxyloyl)-4-(m-trifluoromethylphenyl)-4-piperindol.—Indole-3-glyoxyloyl chloride (18.5 g.; 0.089 mole) was added in portions to a stirred mixture of 25 g. (0.089 mole) of 4-(m-trifluoromethylphenyl)-4-piperidinol, 30 g. of potassium carbonate, 100 ml. of chloroform and 100 ml. of water. After stirring 0.5 hour the organic layer was separated and the aqueous layer extracted with chloroform. The combined organic layer and chloroform extract was dried and concentrated to give 44.2 g. of oil. Thin layer chromatography indicated only a small amount of impurity was present in the oil.

Preparation 15

4-(m-trifluoromethylphenyl)-3,4-dehydropiperidine hydrochloride.—A solution of 15 g. (0.0535 mole) of 4-(m-trifluoromethylphenyl)-4-piperidinol hydrochloride in 75 ml. of 6 N hydrochloric acid was refluxed 3 hours, the solution cooled, neutralized with 3 N sodium hydroxide and extracted several times with chloroform. The combined extracts were dried and concentrated to an oil (13.4 g.). The oil was treated with ethereal hydrogen chloride to give 11.8 g. (84%) of the hydrochloride melting at 204°–206° C. after crystallization from isopropanol. An analytical sample recrystallized from isopropanol melted at 205°–207° C.

Analysis.—Calculated for $C_{12}H_{13}ClF_3N$ (percent): C, 54.65; H, 4.97; N, 5.31. Found (percent): C, 54.87; H, 5.04; N, 5.60.

Utilizing the method of preparation 1, the following compounds are prepared from the stated starting material:

1-[(1-phenylindol-3-yl)glyoxyloyl]-4-benzyl-4-piperidinol from 1-phenylindole-3-glyoxyloyl chloride and 4-benzyl-4-piperidinol.

1-[(2-phenylindol-3-yl)glyoxyloyl]-4-phenyl-4-piperidinol from 2-phenylindole-3-glyoxyloyl chloride and 4-phenyl-4-piperidinol.

1-[(1-benzylindol-3-yl)glyoxyloyl]-3-methyl-4-phenyl-4-piperidinol from 1-benzylindole-3-glyoxyloyl chloride and 3-methyl-4-phenyl-4-piperidinol.

1-[(1-cyclohexyl-3-yl)glyoxyloyl]-3-methyl-4-phenyl-4-piperidinol from 1-cyclohexylindole-3-glyoxyloyl chloride and 3-methyl-4-phenyl-4-piperidinol.

1-(indol-3-ylglyoxyloyl)-4-o-tolyl-4-piperidinol from indole-3-glyoxyloyl chloride and 4-o-tolyl-4-piperidinol.

1-(indol-3-ylglyoxyloyl)-3-methyl-4-o-tolyl-4-piperidinol from indole-3-glyoxyloyl chloride and 3-methyl-4-o-tolyl-4-piperidinol.

1-[(6-trifluoromethylindol-3-yl)glyoxyloyl]-4-phenyl-4-piperidinol from 6-trifluoromethylindole-3-glyoxyloyl chloride and 4-phenyl-4-piperidinol.

The examples below illustrate in detail some of the compounds which comprise this invention and methods for their production. However, this invention is not to be construed as limited thereby in spirit or in scope. It will be apparent to one skilled in the art that numerous modifications in materials and methods can be adopted without departing from the invention.

EXAMPLE 1

3-[2-(3-hydroxypyrrolidinyl)ethyl]indole

A suspension of 11 g. (0.043 mole) of 1-(indol-3-ylglyoxyloyl)-3-pyrrolidinol in 50 ml. of tetrahydrofuran was added dropwise, under nitrogen, to a stirred suspension of 9.8 g. (0.026 mole) of lithium aluminum hydride in 100 ml. of tetrahydrofuran. After addition, the mixture was refluxed for 2 hours, cooled, and treated with enough water to destroy the excess lithium aluminum hydride. The resulting aluminum hydroxide was filtered off and washed thoroughly with tetrahydrofuran. The filtrate was evaporated on a rotating evaporator to an oil which solidified on standing. Crystallization from acetonitrile gave a melting point of 144°–146° C.; yield 7.7 g. (78%).

Analysis.—Calculated for $C_{14}H_{18}N_2O$ (percent): C, 73.01; H, 7.88; N, 12.16, Found (percent): C, 72.80; H, 7.94; N, 12.20.

EXAMPLE 2

2-methyl-3-{2-[3-(3,4,5-trimethoxybenzoyloxy)pyrrolidinyl]ethyl}indole

To a suspension of 5 g. (0.02 mole) of 2-methyl-3-[2-(3-hydroxypyrrolidinyl)ethyl]indole and 8 g. (0.075 mole) of sodium carbonate in 40 ml. of chloroform was added 4.2 g. (0.018 mole) of 3,4,5-trimethoxybenzoyl chloride in 30 ml. of chloroform. The mixture was stirred under anhydrous conditions for 24 hours, then treated with 25 ml. of water and stirred an additional hour. The chloroform layer was separated, dried over magnesium sulfate and evaporated on a rotating evaporator to a viscous oil.

The oil was chromatographed on a magnesium silicate column (60–100 mesh) and eluted with benzene, then benzene with increasing amo unts of acetone. Pure produce began eluting with 10% acetone-benzene; yield 6.2 g. (79%). The pure oil slowly crystallized from ethanol giving 4.8 g. of crystalline solid melting at 119°–121° C.

Analysis.—Calculated for $C_{25}H_{30}N_2O_5$ (percent): C, 68.47; H, 6.90; N, 6.39. Found (percent): C, 68.41; H, 7.10; N, 6.22.

EXAMPLE 3

2-methyl-3-[2-(3-hydroxypyrrolidinyl)ethyl]indole hydrochloride

A suspension of 24 g. (0.088 mole) of 1-[2-methylindol-3-yl)glyoxyloyl]-3-pyrrolidinol in 100 ml. of tetrahydrofuran was added dropwise with stirring under a nitrogen atmosphere to 15 g. (0.40 mole) of lithium aluminum hydride in 200 ml. of tetrahydrofuran. After addition the mixture was refluxed for 3 hours, cooled and the excess lithium aluminum hydride destroyed carefully with water. The mixture was filtered and the aluminum hydroxide washed thoroughly several times with tetrahydrofuran. Evaporation of the combined filtrates gave an oil which would not crystallize. The oil was dissolved in acetone and treated with dry HCl gas. On cooling 18.5 g. of impure product precipitated. Recrystallization from isopropanol-acetonitrile (90:10) gave 13 g. (52%) of pure product melting at 208°–209° C.

Analysis.—Calculated for $C_{15}H_{21}ClN_2O$ (percent): C, 64.16; H, 7.54; N, 9.98. Found (percent): C, 64.37; H, 7.98; N, 9.72.

EXAMPLE 4

3-{2-[3-(3,4,5-trimethoxybenzoyloxy)pyrrolidinyl] ethyl}indole

A mixture of 3 g. (0.013 mole) of 3-[2-(3-hydroxypyrrolidinyl)ethyl]indole, 3 g. (0.013 mole) of 3,4,5-trimethoxybenzoyl chloride and 5 g. (0.05 mole) of sodium carbonate in 40 ml. of chloroform was stirred under anhydrous conditions for 24 hours. Then 0.3 g. of additional acid chloride was added and the mixture stirred another 24 hours. The mixture was treated with 50 ml. of water, stirred for 1 hour and the chloroform layer separated and dried over magnesium sulfate. Evaporation of the chloroform on a rotating evaporator gave an oil which would not crystallize.

The product was chromatographed on a magnesium silicate column (60–100 mesh) and eluted with benzene, then benzene with increasing amounts of acetone. At 10% acetone-benzene pure product began to elute from the column; yield 4.3 g. (78%). The glassy solid could be crystallized from benzene or benzene-ligroin giving a solid which melted between 79° and 86° with gas evolution. Analysis as well as the infrared spectrum indicated that the solid was a benzene solvate.

Analysis.—Calculated for $C_{30}H_{34}N_2O_5$* (percent): C, 71.69; H, 6.82; N, 5.57. Found (percent): C, 71.46; H, 6.77; N, 5.94.

*Benzene solvate.

EXAMPLE 5

3-{2-[3-(3,4,5-trimethoxyphenylcarbamoyloxy)pyrrolidinyl]ethyl}indole

A suspension of 3 g. (0.013 mole) of 3-[2-(3hydroxypyrrolidinyl)ethyl]indole and 3.05 g. (0.013 mole) of 3,4,5-trimethoxybenzoyl azide in 40 ml. of dry benzene was refluxed under nitrogen for 8 hours during which time the suspension slowly dissolved. Removal of the solvent under vacuum gave a dark glassy solid which would not crystallize. The material was dissolved in benzene and chromatographed on 200 g. of 60–100 mesh magnesium silicate, eluting first with benzene and then benzene with increasing amounts of acetone. At 25% acetone-benzene pure product was obtained as a glassy solid; yield 4.2 g. (74%).

Analysis.—Calculated for $C_{24}H_{29}N_3O_5$ (percent): C, 65.58; H, 6.65; N, 9.56. Found (percent); C, 65.34; H, 6.86; N, 9.57.

EXAMPLE 6

3-{2-[3-(4-methoxyphenylcarbamoyloxy)-pyrrolidinyl]ethyl}indole

A stirred suspension of 3.5 g. (0.015 mole) of 3-[2-(3-hydroxypyrrolidinyl)ethyl]indole in 50 ml. of dry benzene was treated dropwise with 2.3 g. (0.015 mole) of p-methoxyphenylisocyanate in 15 ml. of dry benzene. After addition (0.5 hour) the mixture was refluxed for 12 hours after which time only a small amount of solid remained suspended. The residue was filtered off and the filtrate was evaporated under vacuum to an orange gum. The product was dissolved in benzene and chromatographed on 200 g. of 60–100 mesh magnesium silicate, eluting first with benzene then benzene with increasing amounts of acetone. At 20% acetone-benzene pure product was obtained from the column; yield 3.5 g. (60%). The glassy solid would not crystallize.

Analysis.—Calculated for $C_{22}H_{25}N_3O_3$ (percent): C, 69.63; H, 6.64; N, 11.07. Found (percent): C, 69.35; H, 6.76; N, 11.12.

EXAMPLE 7

5,6-dimethoxy-3-[2-(3-hydroxypyrrolidinyl)ethyl]indole hydrochloride monohydrate A mixture of 5.5 g. (0.017 mole) of 1-[(5,6-dimethoxyindol-3-yl)glyoxyloyl]-3-pyrrolidinol in 50 ml. of dry tetrahydrofuran was added dropwise to a stirred suspension of 2.85 g. (0.075 mole) of lithium aluminum hydride in 100 ml. of tetrahydrofuran under nitrogen. After addition the mixture was refluxed for 4 hours, cooled in ice and treated with a saturated sodium sulfate solution. The inorganic salts were removed by filtration and washed thoroughly with tetrahydrofuran. The filtrates were evaporated under reduced pressure yielding 4 g. of crude product. Although separation of the pure material from its impurities could be effected using partition chromatography on thin-layer plates, several attempts using larger amounts on a column failed.

The remaining crude product (2 g.) was dissolved in isopropanol and treated with ethereal hydrogen chloride. After standing several days in the cold the dark gray amorphous solid was filtered off, washed with ether and air dried. The product decomposed slowly about 95° C. and was shown to be a monohydrate by analysis; yield 0.7 g.

Analysis.—Calculated for $C_{16}H_{25}ClN_2O_4$ (hydrate) (percent): C, 55.72; H, 7.30. Found (percent): C, 56.50; H, 7.18.

Analysis.—Calculated for $C_{16}H_{23}ClN_2O_3$ (dried at 100°) (percent): C, 58.80; H, 7.09; N, 8.57. Found (percent): C, 59.09; H, 6.96; N, 8.29.

EXAMPLE 8

3-{2-[3-(o-methoxyphenoxy)pyrrolidinyl]ethyl}indole hydrochloride

A solution of 13.5 g. (0.037 mole) of 1-(indole-3-ylglyoxyloyl)-3-(o-methoxyphenoxy)pyrrolidine in 50 ml. of anhydrous tetrahydrofuran was added dropwise to a stirred slurry of 7 g. (0.18 mole) of lithium aluminum hydride in 150 ml. of anhydrous tetrahydrofuran. The reaction mixture was worked up in the usual manner and the oily basic material which was isolated was dissolved in ether and treated with ethereal hydrogen chloride. The isolated hydrochloride weighed 10.7 g. (73%) and melted with decomposition (gas evolution) near a55° C. as a result of solvated ether. Thin layer chromatography of a sample of regenerated free base showed a single spot.

Analysis.—Calculated for $C_{21}H_{25}ClN_2O_2$ (percent): C, 67.64; H, 6.76; N, 7.51. Found (after drying at 120°) (percent): C, 67.72; H, 7.07; N, 7.43.

EXAMPLE 9

3-[2-(4-phenyl-3,4-dehydropiperidinyl)ethyl]indole

Twenty-two and four-tenths grams (0.066 mole) of 1-(indol-3-ylglyoxyloyl)-4-phenyl-3,4-dehydropiperidine suspended in 100 ml. of tetrahydrofuran was added dropwise to a stirred suspension of 10.1 g. (0.27 mole) of lithium aluminum hydride in 300 ml. of tetrahydrofuran under a nitrogen atmosphere. The reaction mixture was refluxed three hours, cooled, and the excess metal hydride decomposed cautiously by the addition of ice. The mixture was filtered free of inorganic salts and the filtrate concentrated to an oil which solidified on standing. Three recrystallizations of the impure solid (M.P. 132°–134° C.) from benzene-isooctane gave 7.2 g. (36%) of pure product melting at 138°–140° C.

Analysis.—Calculated for $C_{21}H_{22}N_2$ (percent): C, 83.40; H, 7.33; N, 9.26. Found (percent): C, 83.45; H, 7.38; N, 9.17.

EXAMPLE 10

2-methyl-3-[2-(4-phenyl-3,4-dehydropiperidinyl) ethyl]indole

Using the method of Example 9, 18.3 g. (0.053 mole) of 1-[(2-methylindol-3-yl)glyoxyloyl]-4-phenyl-3,4-dehydropiperidine was reduced using 10.1 g. (0.266 mole) of lithium aluminum hydride to give 3.9 g. of 2-methyl-3-[2-(4-phenyl-3,4-dehydropiperidinyl) ethyl]indole melting at 142°–144° C.

Analysis.—Calculated for $C_{22}H_{24}N_2$ (percent): C, 83.50; H, 7.65; N, 8.85. Found (percent): C, 83.47; H, 7.54; N, 8.81.

EXAMPLE 11

5-chloro-3-[2-(4-phenyl-3,4-dehydropiperidinyl)ethyl-]indole

Using the method of Example 9, 10.0 g. (0.0274 mole) of 1-[(5-chloroindol-3-yl)glyoxyloyl]-4-phenyl-3,4-dehydropiperidine was reduced using 5.2 g. (0.137 mole) of lithium aluminum hydride to give 6.3 g. of 5-chloro-3-[2-(4-phenyl-3,4-dehydropiperidinyl)ethyl-]indole melting at 166°–169° C. Recrystallization from benzene raised the melting point to 168°–170° C.

Analysis.—Calculated for $C_{21}H_{21}ClN_2$ (percent): C, 74.87; H, 6.28; N, 8.32. Found (percent): C, 75.10; H, 6.20; N, 8.26.

EXAMPLE 12

2,5-dimethyl-3-[2-(4-phenyl-3,4-dehydropiperidinyl) ethyl]indole

Using the method of Example 9, 8.0 g. (0.0224 mole) of 1-[(2,5-dimethylindol-3-yl)glyoxyloyl]-4-phenyl-3,4-dehydropiperidine was reduced using 4.25 g. (0.112 mole) of lithium aluminum hydride to give 4.5 g. (61%) of 2,5-dimethyl-3-[2-(4-phenyl-3,4-dehydroperidinyl)ethyl]indole which melted at 150°–152° C. after recrystallization from benzene.

Analysis.—Calculated for $C_{23}H_{20}N_2$ (percent): C, 83.59; H, 7.93; N, 8.48. Found (percent): C, 83.38; H, 7.92; N, 8.72.

EXAMPLE 13

5,6-dimethoxy-3-[2-(4-phenyl-3,4-dehydropiperidinyl) ethyl]indole

Using the method of Example 9, 6.9 g. (0.0177 mole) of 1-[5,6-dimethoxyindol-3-yl)glyoxyloyl]-4-phenyl-3,4-dehydropiperidine was reduced using 3.36 g. (0.0885 mole) of lithium aluminum hydride to give a crude oil which was purified by chromatography to give 1.3 g. of 5,6-dimethoxy-3-[2-(4-phenyl-3,4-dehydropiperidinyl)ethyl]indole melting at 125°–127° C.

Analysis.—Calculated for $C_{23}H_{26}N_2O_2$ (percent): C, 76.21; H, 7.23; N, 7.73. Found (percent): C, 75.78; H, 7.14; N, 7.97.

EXAMPLE 14

5,6-dimethoxy-2-methyl-3-[2-(4-phenyl-3,4-dehydropiperidinyl)ethyl]indole

Using the method of Example 9, 17 g. (0.0353 mole) of 1-[(5,6-dimethoxy-2-methylindol-3-yl)glyoxyloyl]-4-phenyl-3,4-dehydropiperidine was reduced using 6.8 g. (0.176 mole) of lithium aluminum hydride to give 8.1 g. of 5,6-dimethoxy-2-methyl-3-[2-(4-phenyl-3,4-dehydropiperidinyl)ethyl]indole melting at 116°–118° C. Recrystallization from benzene-isooctane raised the melting point to 117°–118° C.

Analysis.—Calculated for $C_{24}H_{28}N_2O_2$ (percent): C, 76.56; H, 7.50; N, 7.44. Found (percent): C, 76.17; H, 7.40; N, 7.50.

EXAMPLE 15

5-benzyloxy-3-[2-(4-hydroxy-4-phenylpiperidinyl) ethyl]indole hydrochloride

Using the method of Example 9, 30 g. (0.066 mole) of 1-[(5-benzyloxyindol-3-yl)glyoxyloyl]-4-hydroxy-4-phenylpiperidine was reduced using 12.5 g. (0.33 mole) of lithium aluminum hydride to give 30 g. of 5-benzyloxy-3-[2-(4-hydroxy-4-phenylpiperidinyl)ethyl]indole. The hydrochloride salt was prepared and after recrystallization from isopropanol melted at 208°–210° C. The yield was 25.5 g. (83%).

Analysis.—Calculated for $C_{28}H_{31}ClN_2O_2$ (percent): C, 72.63; H, 7.66; N, 6.05. Found (percent): C, 72.63; H, 6.88; N, 5.90.

EXAMPLE 16

5-hydroxy-3-[2-(4-hydroxy-4-phenylpiperidinyl)ethyl] indole

A solution of 10 g. of 5-benzyloxy-3-[2-(4-hydroxy-4-phenylpiperidinyl)ethyl]indole in 10 ml. of ethanol was shaken on the Parr apparatus at room temperature at an initial pressure of 50 p.s.i., using a 10% palladium on charcoal catalyst. After debenzylation was complete the solution was filtered and the catalyst washed thoroughly with three 100 ml. portions of hot ethanol. Concentration of the original filtrate gave 3 g. of an oil which solidified and was recrystallized from ethyl acetate-methanol to give 1.85 g. of material which melted at 150° C., resolidified and melted again at 235°–240° C. The combined alcohol washes on concentration gave 4 g. of a white solid which after recrystallization from ethyl acetate-methanol gave 3.4 g. of material which melted at 150° C., recrystallized and melted again at 235°–240° C. A nuclear magnetic resonance spectrum indicated the above solids to be solvated with methanol. A sample was dried in vacuo at 110° for 24 hours; the dried sample melted at 238°–240° C.

Analysis.—Calculated for $C_{21}H_{25}ClN_2O_2$ (percent): C, 67.64; H, 6.76; N, 7.51. Found (percent): C, 67.29; H, 6.87; N, 7.54.

EXAMPLE 17

3-[2-(4-hydroxy-4-phenylpiperidinyl)ethyl]indole

A solution of 17.0 g. (0.049 mole) of 1-(indol-3-ylglyoxyloyl)-4-phenyl-4-piperidinol in 100 ml. of tetrahydrofuran was reduced in the usual way with 7.4 g. (0.195 mole) of lithium aluminum hydride in 200 ml. of tetrahydrofuran. After the usual workup 11.6 g. of oil was obtained which was crystallized from benzene-isooctane yielding 8.6 g. (55%) of product which melted at 133°–137° C. Another recrystallization from benzene raised the melting point to 137°–139° C. The analytical sample melted at 137°–139° C.

Analysis.—Calculated for $C_{21}H_{24}N_2O$ (percent): C, 78.71; H, 7.55; N, 8.74. Found (percent): C, 78.30; H, 7.36; N, 8.60.

EXAMPLE 18

3-[2-(4-phenyl-4-propionyloxypiperdinyl)ethyl]indole

A mixture of 4 g. (0.0125 mole) of 3-[2-(4-hydroxy-4-phenylpiperidinyl)ethyl]indole, 1.19 g. (0.0125 mole) of propionyl chloride and 7 g. of potassium carbonate in 50 ml. of chloroform was allowed to stir for 2 hours. Then 0.4 g. of additional propionyl chloride was added and allowed to stir another 30 minutes. The mixture was treated with 50 ml. of water and allowed to stir 30 minutes. The chloroform layer was separated, dried over magnesium sulfate and evaporated under reduced pressure to an oil. The oil was crystallized from benzene-isooctane and yielded 3.0 g. (64%) of product which melted at 140°–142° C. After an additional recrystallization the analytical sample melted at 142°–144° C.

Analysis.—Calculated for $C_{24}H_{28}N_2O_2$ (percent): C, 76.56; H, 7.50; N, 7.44. Found (percent): C, 76.52; H, 7.47; N, 7.44.

EXAMPLE 19

3-[2-(4-hydroxy-4-m-trifluoromethylphenyl-piperidinyl)ethyl]indole hydrochloride A solution of 37 g. (0.089 mole (of 1-(indol-3-yl glyoxyloyl)-4-(m-trifluoromethylphenyl)-4-piperidinol in 100 ml. of tetrahydrofuran was added dropwise under nitrogen to a stirred suspension of 16.9 g. (0.445 mole) of lithium aluminum hydride in 100 ml. of tetrahydrofuran. The reaction was refluxed two hours and then worked up in the usual manner. Recrystallization of the isolated solid from benzene-isooctane gave 26.5 g. (70%) of pure product which was shown by nuclear magnetic resonance to be a benzene solvate. A portion of the free base was converted to the hydrochloride salt which melted at 244°–246° C. after crystallization from isopropanol containing a small amount of methanol.

Analysis.—Calculated for $C_{22}H_{24}ClF_3N_2O$ (percent): C, 62.19; H, 5.69; N, 6.59. Found (percent): C, 62.55; H, 6.13; N, 6.40.

EXAMPLE 20

3-[2-(4-propionyloxy-4-m-trifluoromethylphenyl-piperidinyl)ethyl]indole hydrochloride A mixture of 10 g. (0.0234 mole) of 3-[2-(4-hydroxy-4-m-trifluoromethylphenylpiperidinyl)ethyl-]indole, 20 g. of potassium carbonate, 2.48 g. (0.0258 mole) of propionyl chloride and 100 ml. of chloroform was stirred four hours at room temperature. An additional 2.0 g. of propionyl chloride was added and the mixture allowed to stir overnight at room temperature. The reaction mixture was treated with 80 ml. of water and 20 ml. of 3 N sodium hydroxide, stirred 0.5 hour and the layers separated. Concentration of the organic layer gave 9.0 g. of oil which was converted to the hydrochloride salt. Recrystallization of the salt from isopropanol-isopropyl ether gave 7.6 g. (68%) of product melting at 169°–172° C.

Analysis.—Calculated for $C_{25}H_{28}ClF_3N_2O_2$ (percent): C. 62.43; H, 5.87; N, 5.83. Found (percent): C, 62.58; H, 5.89; N, 6.02.

EXAMPLE 21

3-[2-(4-m-trifluoromethylphenyl-3,4-dehydropiperidinyl]ethyl]indole

Ten grams (0.0234 mole) of 3-[2-(4-hydroxy-4-m-trifluoromethylphenylpiperidinyl)ethyl]indole benzene solvate was refluxed 24 hours under nitrogen with 75 ml. of 2:1 glacial acetic acid-concenrated hydrochloric acid. The cooled mixture was neutralized with 3 N sodium hydroxide and the aqueous mixture extracted with chloroform. The combined extracts were dried and concentrated to an oil which solidified. The crude solid was dissolved in a minimum amount of benzene and was chromatographed using 300 g. of magnesium silicate. The product was eluted with acetone-benzene and at 10% acetone-benzene pure product began to be eluted. Elution began to diminish at 65% acetone-benzene. Six grams of solid was isolated from which 4.3 g. (49%) of product melting at 152°–154° C. was obtained after crystallization from benzene-isooctane.

Analysis.—Calculated for $C_{22}H_{21}F_3N_2$ (percent): C, 71.33; H, 5.71; N, 7.56. Found (percent): C, 71.52; H, 5.71; N, 7.89.

EXAMPLE 22

1-methyl-3-[2-(4-phenyl-3,4-dehydropiperidinyl) ethyl]indole hydrochloride

To a gently refluxing solution of 3 g. (0.01 mole) of 3-[2-(4-phenyl-3,4-dehydropiperidinyl(ethyl]indole in 50 ml. of acetone was added all at once 7.5 g. of powdered KOH followed immediately by 1.39 g. (0.01 mole) of methyl iodide in 25 ml. of acetone, added dropwise. After stirring 5 minutes at reflux the mixture was cooled and filtered. The filtrate was evaporated to an oil which was dissolved in chloroform. After washing with water the chloroform solution was dried over magnesium sulfate and evaporated to an oil. The impure product, 3.4 g., was dissolved in benzene and chromatographed on 150 g. of 60–100 mesh magnesium silicate eluting with benzene containing increasing amounts of acetone. The purified oil was dissolved in ether and treated with ethereal HCl. The resulting salt melted at 217°–220° C. after recrystallization from isopropanol. The analytical sample melted at 219°–222° C.

Analysis.—Calculated for $C_{22}H_{25}ClN_2$ (percent): C, 74.87; H, 7.14; N, 7.94. Found (percent): C, 74.67; H, 7.26; N, 8.09.

EXAMPLE 23

3-[2-(4-p-fluorophenyl-3,4-dehydropiperidinyl)ethyl] indole

A suspension of 8.9 g. (0.0256 mole) of 1-(indol-3-ylglyoxyloyl)-4-(p-fluorophenyl)-3,4-dehydropiperidine in 50 ml. of tetrahydrofuran was added slowly to a stirred suspension of 4.85 g. (0.13 mole) of lithium aluminum hydride in 50 ml. of tetrahydrofuran. The stirred mixture was allowed to reflux under an atmosphere of nitrogen for 2 hours then worked up in the usual way. The crude crystalline product was recrystallized from benzene and yielded 3.6 g. (48%) of product which melted at 156°–158° C. The analytical sample was recrystallized from benzene and melted at a15-7°–159° C.

Analysis.—Calculated for $C_{21}H_{21}FN_2$ (percent): C, 78.72; H, 6.61; N, 8.74. Found (percent): C, 79.04; H, 6.74; N, 8.60.

Utilizing the process of Example 1, the following compounds are prepared from the stated starting materials:

1-phenyl-3-[2-(4-benzyl-4-hydroxypiperidinyl)ethyl-]indole by reacting 1-[(1-phenylindol-3-yl)glyoxyloyl]-4-benzyl-4-piperidinol with lithium aluminum hydride.

1-benzyl-3-[2-(4-hydroxy-3-methyl-4-phenylpiperidinyl) ethyl]indole by reacting 1-[(1-benzylindol-3-yl) glyoxyl]-3-methyl-4-phenyl-4-piperidinol with lithium aluminum hydride.

1-cyclohexyl-3-[2-(4-hydroxy-3-methyl-4-phenylpiperidinyl)ethyl]indole by reacting 1-[(1-cyclohexyl-3-yl) glyoxyloyl]-3-methyl-4-phenyl-4-piperidinol with lithium aluminum hydride.

3-[2-(4-hydroxy-4-o-tolylpiperidinyl)ethyl]indole by reacting 1-(indol-3-ylglyoxyloyl)-4-o-tolyl-4-piperidinol with lithium aluminum hydride.

3-[2-(4-hydroxy-3-methyl-4-o-tolylpiperidinyl)ethyl] indole by reacting 1-(indol-3-ylglyoxyloyl)-3-methyl-4-o-tolyl-4-piperidinol with lithium aluminum hydride.

6-trifluoromethyl-3-[2-(4-hydroxy-4-phenylpiperdinyl)ethyl]indole by reacting 1-[(6-trifluoromethylindol-3-yl)glyoxyloyl]-4-phenyl-4-piperidinol with lithium aluminum hydride.

2-phenyl-3-[2-(4-hydroxy-4-phenylpiperidinyl)ethyl-]indole by reacting 1-[(2-phenylindol-3-yl)glyoxyloyl]-4-phenyl-4-piperidinol with lithium aluminum hydride.

EXAMPLE 24

1-benzoyl-3-[2-(4-phenyl-3,4-dehydropiperidinyl) ethyl]indole

A solution of 30 g. (0.1 mole) of 3-[2-(4-phenyl-3,4-dehydropiperidinyl)ethyl]indole in 75 ml. of dimethylformamide is added dropwise to a stirred slurry of 4.8 g. (0.1 mole) of sodium hydride (50% suspension in mineral oil) in 50 ml. of dimethylformamide maintained at 10° C. After stirring one hour 14.0 g. (0.1 mole) of benzyl chloride is added dropwise, the reaction mixture being maintained at 5°–10° C. After addition the reaction mixture is stirred several hours at room temperature and then poured into two volumes of cold water. The precipitated product is collected by suction filtration and dried.

EXAMPLE 25

1-propionyl-3-[2-(4-phenyl-3,4-dehydropiperidinyl) ethyl]indole

To a stirred slurry of 4.8 g. (0.1 mole) of sodium hydride (50% suspension in mineral oil) in 75 ml. of dimethylformamide maintained at 5°–10° C. is added dropwise a solution of 30 g. (0.1 mole) of 3-[2-(4-phenyl-3,4-dehydropiperidinyl)ethyl indole. The mixture is stirred two hours and is treated dropwise at 5°–10° C. with 10 g. (0.1 mole) of propionyl chloride. The reaction mixture is stirred four hours at room temperature and is then added to two volumes of cold water. The precipitated product is collected by suction filtration.

EXAMPLE 26

1-methyl-3-[2-(4-phenyl-3,4-dehydropiperidinyl) ethyl]indole methoiodide

A mixture of 5.0 g. of 1-methyl-3-[2-(4-phenyl-3,4-dehydropiperidinyl)ethyl]indole and 5.0 ml. of methyl iodide is warmed for a minute and then cooled in an ice bath with scratching with a glass rod to induce crystallization. The quaternary salt which separates is collected and dried.

Pharmacology

The compounds of the present invention were screened for anti-Parkinsonism and were observed to be effective in eliminating the pronounced symptom complex of tremor, motor incoordination, lacrimation and catatonia. 4-methoxyphenethylamine is excreted by Parkinson patients, indicating the diseased state to be associated with an abnormality of the normal process by which certain biogenic amines are methylated. Injection of 4-methoxyphenethylamine into laboratory animals results in the syndrome of Partkinsonism. The efficacy of the novel compounds was determined by administering each of them to groups of five mice. One hour later 4-methoxyphenethylamine was given intraperitoneally. The mice were observed for the symptoms of Parkinsonism and a drug's effectiveness was determined by the complete prevention of tremor, motor incoorination, lacrimation and catatonia. The $ED_{50}$ of each drug was determined by the injection of appropriate number of doses and subjecting the results to probit analysis according to the method of J. T. Litchfield and F. Wilcoxon, J. Pharm. and Exptl. Therap. 96, 99 (1949).

Formulation and administration: Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition or quaternary ammonium salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one-hundred milligrams. Five to fifty milligrams appears optimum per unit dose, while usual broader ranges appear to be one to 500 milligrams per unit dose. The active agents of the invention may be combined with other Pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

Examples of compositions within the preferred ranges given are as follows:

| Capsules | |
|---|---|
| Ingredients: | Per cap., mg. |
| (1) Active ingredient, as salt | 25,000 |
| (2) Lactose | 146,000 |
| (3) Magnesium stearate | 4,000 |

Procedure:

(1) Blend 1, 2 and 3.

(2) Mill this blend and blend again.

(3) This milled blend is then filled into No. 1 hard gelatin capsules.

| Tablets | |
|---|---|
| Ingredients: | Mg./tab., |
| (1) Active ingredient, as salt | 25.0 |
| (2) Corn starch | 20.0 |
| (3) Alginic acid | 20.0 |
| (4) Sodium alginate | 20.0 |
| (5) Magnesium stearate | 1.3 |

Procedure:

(1) Blend 1, 2, 3 and 4.

(2) Add sufficient water portionwise to the blend from step No. 1 with careful stirring after each addition. Such additions of water and stirring continue until the mass is of a consistency to permit its conversion to wet granules.

(3) The wet mass is converted to granules by passing it through the oscillating granulator, using 8-mesh screen.

(4) The wet granules are then dried in an oven at 140° F.

(5) The dried granules are then passed through an oscillating granulator, using a 10-mesh screen.

(6) Lubricate the dry granules with 0.5% magnesium stearate.

(7) The lubricated granules are compressed on a suitable tablet press.

| Intramuscular injection | |
|---|---|
| Ingredients: | Per ml. |
| (1) Active ingredient, as salt | 25.0 mg. |

-continued

| Intramuscular injection | |
|---|---|
| Ingredients: | Per ml. |
| (2) Isotonic buffer solution 4.0 | Q.s. to 2.0 ml. |

Procedure:

(1) Dissolve the active ingredient in the buffer solution.

2) Aseptically filter the solution from step No. 1.

(3) The sterile solution is now aseptically filled into sterile ampoules.

(4) The ampoules are sealed under aseptic conditions.

Various modifications and equivalents will be apparent to one skilled in the art and may be made in the compounds, methods, compositions, and procedures of the present invention without departing from the spirit or scope thereof, and it is therefore to be understood that the invention is to be limited only by the scope of the appended claims.

What is claimed and desired to be secured by U.S. Letters Patents is:

1. A member selected from the group consisting of compounds having the formula:

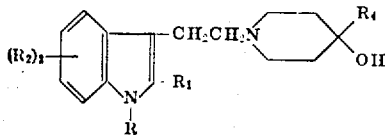

and pharmaceutically acceptable acid addition salts thereof, wherein;

$R_1$ is selected from the group consisting of hydrogen and lower alkyl;

$R_1$ is selected from the group consisting of hydrogen, lower alkyl and phenyl;

$R_2$ is selected from the group consisting of hydrogen, fluoro, chloro, bromo, lower-alkyl and lower-alkoxy; and $R_4$ is selected from the group consisting of benzyl, phenyl and mono-substituted phenyl in which the substituent is selected from the group consisting of fluoro, chloro, bromo, lower-alkyl and trifluoromethyl.

2. A compound selected from the group consisting of a free base and its pharmaceutically acceptable acid addition and quaternary ammonium salts, the free base having the structural formula:

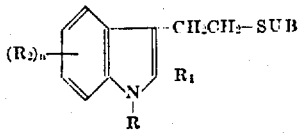

wherein:

R is selected from the group consisting of hydrogen, lower-alkyl, lower-alkanoyl, benzoyl, benzyl, and cycloalkyl containing three to nine carbon atoms inclusive;

$R_1$ is selected from the group consisting of hydrogen, lower-alkyl, and phenyl;

$R_2$ is selected from the group consisting of hydrogen, halogen of atomic weight less than 80, trifluoromethyl, hydroxyl, lower-alkyl, lower-alkoxy, and benzyloxy;

n is an integer from zero to four inclusive;

SUB is a member selected from the group consisting of

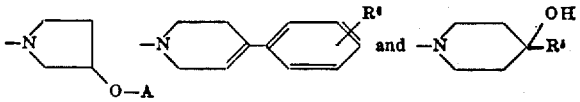

wherein;

A is selected from the group consisting of hydrogen, 3,4,5-trimethoxybenzoyl, 3,4,5-trimethoxyphenylcarbamoyl, p-methoxycarbamyol, and 2-methoxyphenyl;

$R^5$ is a member selected from the group consisting of benzyl, phenyl and monosubstituted phenyl in which the substituent is selected from the group consisting of lower-alkyl, trifluoromethyl, and halogen of atomic weight less than 80, and $R^6$ is selected from the group consisting of trifluoromethyl and halogen of atomic weight less than 80.

3. A compound of claim 2 which is 3-[2-(3-hydroxypyrrolidinyl)ethyl]indole.

4. A compound of claim 2 which is 2-methyl-3-{2-[3-(3,4,5-trimethyoxybenzoyloxy)pyrrolidinyl]ethyl]}indole.

5. A compound of claim 2 which is 2-methyl-3-[2-(3-hydroxypyrrolidinyl)ethyl]indole hydrochloride.

6. A compound of claim 2 which is 3-{2-[3-(3,4,5-trimethoxybenzoyloxy)pyrrolidinyl]ethylene]}indole.

7. A compound of claim 2 which is 3-{2-[3-(3,4,5-trimethoxyphenylcarbamoyloxy)pyrrolidinyl]ethyl-]}indole.

8. A compound of claim 2 which is 5,6-dimethoxy-3-[2-(3-hydroxypyrrolidinyl)ethyl]indole hydrochloride.

9. A compound of claim 2 which is 3-{2-[3-(o-methoxyphenoxy)pyrrolidinyl]ethyl]}indole hydrochloride.

10. A compound of claim 2 which is 3-{2-[3-(4-methoxyphenylcarbamoyloxy)pyrrolidinyl]ethyl]}indole.

11. A compound of claim 2 which is 3-[2-(4-hydroxy-4-phenylpiperidinyl)ethyl]indole.

12. [A compound of claim 2 which is] 3-[2-(4-phenyl-3,4-dehydropiperidinyl)ethyl]indole.

13. [A compound of claim 2 which is] 2-methyl-3[2-(4-phenyl-3,4-dehydropiperidinyl)ethyl]indole.

14. [A compound of claim 2 which is] 2-methyl-5,6-dimethoxy-3-[2-(4-phenyl-3,4-dehydropiperidinyl-)ethyl]indole.

15. [A compound of claim 2 which is] 5-chloro-3[2-(4-phenyl-3,4-dehydropiperidinyl)ethyl]indole.

16. A compound of claim 2 which is 5-benzyloxy-3-[2-(4-hydroxy-4-phenylpiperidinyl)ethyl]indole hydrochloride.

17. A compound of claim 2 which is 5-hydroxy-3-[2-(4-hydroxy-4-phenylpiperidinyl)ethyl]indole.

18. [A compound of claim 2 which is] 5,6-dimethoxy-3-[2-(4-phenyl-3,4-dehydropiperidinyl)ethyl]indole.

19. [A compound of claim 2 which is] 2,5-dimethyl-3-[2-(4-phenyl-3,4-dehydropiperidinyl)ethyl]indole.

20. A compound of claim 2 which is 3-[2-(4-hydroxy-4-m-trifluoromethylphenylpiperidinyl)ethyl-]indole hydrochloride.

21. A compound of claim 2 which is 3-[2-(4-m-trifluoromethylphenyl-3,4-dehydropiperidinyl)ethyl]indole.

22. [A compound of claim 2 which is] 1-methyl-3-[2-(4-phenyl-3,4-dehydropiperidinyl)ethyl]indol

23. A compound of claim 2 which is 3-[2-(4-p-fluorophenyl-3,4-dehydropiperidinyl)ethyl]indole.

24. A compound selected from the group having the formula:

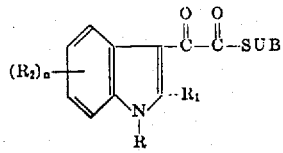

wherein;

R is selected from the group consisting of hydrogen, lower-alkyl, benzyl, and cycloalkyl containing three to nine carbon atoms inclusive;

$R_1$ is selected from the group consisting of hydrogen, lower-alkyl and phenyl;

$R_2$ is selected from the group consisting of hydrogen, halogen of atomic weight less than 80, trifluoromethyl, hydroxyl, lower-alkyl, lower-alkoxy and benzyloxy;

n is an integer from zero to four inclusive;

SUB is a member selected from the group consisting of

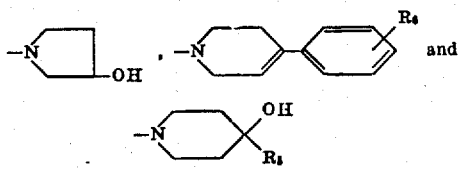

wherein;

$R_5$ is a member selected from the group consisting of benzyl, phenyl and monosubstituted phenyl in which the substituent is selected from the group consisting of lower-alkyl, trifluoromethyl, and halogen of atomic weight less than 80, and $R_6$ is selected from the group consisting of trifluoromethyl and halogen of atomic weight less than 80.

* * * * *